W. CLIFFORD.
DIFFERENTIAL SHAFT COUPLING.
APPLICATION FILED NOV. 13, 1913.

1,093,537.

Patented Apr. 14, 1914.

WITNESSES
L. L. Burket.
E. Rosenberg.

INVENTOR
William Clifford,
BY A. A. Patterson.
ATTORNEY

COLUMBIA PLANOGRAPH CO., WASHINGTON, D. C.

UNITED STATES PATENT OFFICE.

WILLIAM CLIFFORD, OF DULUTH, MINNESOTA.

DIFFERENTIAL SHAFT-COUPLING.

1,093,537.  Specification of Letters Patent.  Patented Apr. 14, 1914.

Application filed November 13, 1913.  Serial No. 800,817.

*To all whom it may concern:*

Be it known that I, WILLIAM CLIFFORD, a citizen of the United States, residing at Duluth, in the county of St. Louis and State of Minnesota, have invented certain new and useful Improvements in Differential Shaft-Couplings, of which the following is a specification, reference being had therein to the accompanying drawing.

My invention relates to improvements in differential shaft couplings.

The object of my invention is to provide a shaft coupling whereby the two ends of a shaft may be coupled together against longitudinal movements, yet each end free to rotate within the coupling independent of each other.

Another object of my invention is to provide a coupling more especially designed for a sectional car-axle in which it is desirable to admit one end of the axle sections revolving at different speeds, and whereby the axle is permanently mounted in the coupling and can only be removed by breakage.

A still further object of my invention is to provide a coupling of this character in which the ends of the axle are held by molten metal poured into the coupling and providing means whereby the shrinkage of the metal will not cause a binding of the axle ends and at the same time providing a simple, cheap and effective coupling having certain details of structure hereinafter more fully described.

Figure 1:
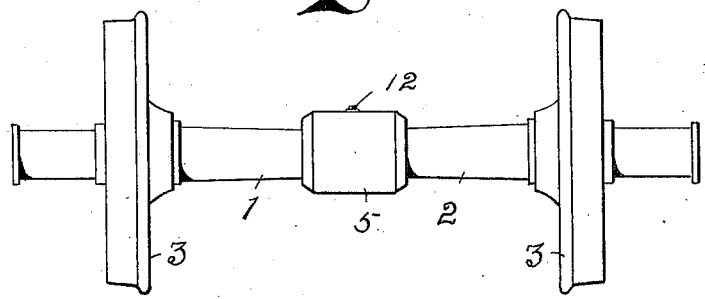
Figure 2:
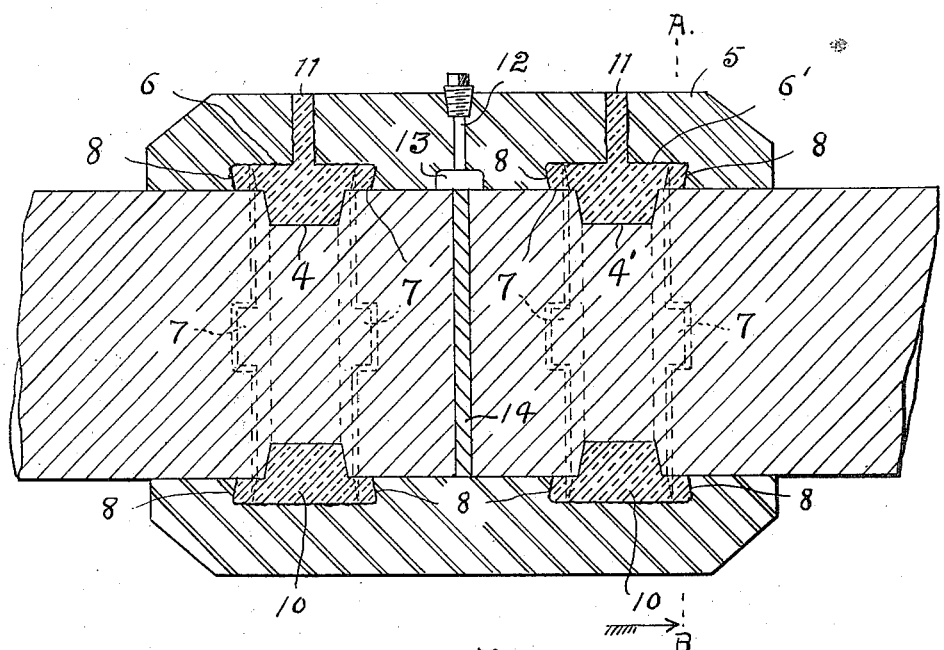
Figure 3:
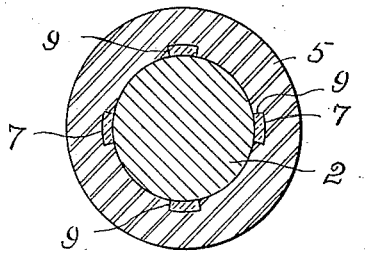

In the accompanying drawings forming part of this specification, Figure 1 is an elevation of a car-axle equipped with my improved differential coupling; Fig. 2 is an enlarged vertical longitudinal sectional view through the center of the coupling, and; Fig. 3 is a transverse vertical sectional view taken on the line A—B, Fig. 2.

The axle comprises two sections 1 and 2 each carrying a traction wheel 3. Upon the inner end of each section and some little distance from the end thereof is formed an annular recess 4 and 4' the same being preferably slightly smaller at the bottom than at the top or in other words, having inwardly tapering side walls.

A preferably cast metal sleeve 5 is bored longitudinally to produce a snug running fit about the adjacent ends of the two axle sections 1 and 2 whereby a perfect centering of the adjacent ends is insured, this being a very essential feature in such devices.

Formed within the inner wall of the sleeve 5 are dovetailed annular grooves or recesses 6 and 6' preferably somewhat wider than the recesses 4 and 4' in the axle sections 1 and 2 and which register therewith when the sleeve is in position, the additional width of the recesses 6 and 6' being to insure such registration against any possible variation in the positions of the recesses 4 and 4' whereby the full width of the thrust rings hereinafter more fully described is insured. This increase in the width of the recesses 6 and 6' is also for the purpose of increasing the frictional surface for the rings to prevent same from moving.

The annular recesses 6 and 6' are formed each with a plurality of relatively smaller laterally formed recesses 7 extending longitudinally of the coupling, there preferably being an equal number of such auxiliary recesses upon either side of each recess 6 and either opposed to each other or staggering.

The end walls 8 and side wall 9 of the auxiliary recesses 7 are both inclined inwardly radially as shown to form a dovetailed section both longitudinally and transversely of the sleeve. The object of dovetailed form of recesses both in the axle sections and sleeve is to prevent the thrust-rings 10 which are formed by the pouring of molten metal therein from shrinking tight upon the axle sections when cooling for as is clearly evident, the tendency of such a ring to shrink diametrically when cooling, is very great and otherwise would become bound upon the axle sections if not held against shrinkage. The object of the lateral recesses 7 is to insure against any possible movement of the ring 10 within the sleeve after having been formed therein and it is evident that other forms of recesses may be resorted to without departing from the invention.

Openings 11 are formed through the wall of the sleeve 5 and communicate with the various recesses, said openings being for the purpose of pouring into the recess molten metal to form the locking thrust rings 10 which completely fill the registering recesses, the openings 11 filling at the same time and forming a smooth exterior of the sleeve. These rings are intended in no way as a bearing for the axle as that is taken care of by direct contact between the axle and the bore of the sleeve apart from the contact of the rings, they being intended to withstand the end thrust alone of the axle and act as a locking means to prevent separation of the axle sections, and being composed of suitable metal for that purpose, preferably gunmetal, steel or such like.

An oil aperture 13 of any desired size is formed within the inner wall of the sleeve 5 and communicates with the abutting ends of the axle for lubricating purposes and also communicates with the exterior of the sleeve by means of the hole 12 so that a suitable lubricant may be applied in any convenient manner.

In the event of an old axle being cut to apply my improved differential coupling, a filler 14 is used to occupy the space made by the cutting process, but where a new axle is made for the purpose the ends will abut directly and the filler dispensed with.

I prefer to form the recesses 6 and 6' within the sleeve 5 when the latter is cast, thereby making the inner walls of the recesses somewhat rough to more readily hold the molten metal forming the rings 10 against movement after cooling and the recesses 4 and 4' in the sections 1 and 2 are somewhat tapered as before described to produce the opposite results and admit of the ready revolution of the axle or shaft sections independent of each other. It is evident that any number of these thrust rings may be made use of, depending upon the work demanded of the axle thus coupled.

I have thus produced a simple differential coupling formed integral with the abutting ends of a shaft and one that can not be removed without being broken or destroyed.

Having thus described my invention, what I claim and desire to secure by Letters Patent is:

1. A differential shaft coupling comprising a sleeve, shafts extending into the sleeve from opposite ends, said shafts having grooves adjacent their ends said sleeve having grooves opposite the grooves in the shaft and having lateral locking recesses and molten metal within the grooves in the sleeve forming rings for permanently and rotatably uniting the ends of the shaft within the sleeve.

2. A differential shaft coupling comprising a sleeve having grooves in its inner periphery, shafts extending into the sleeve from opposite ends and having grooves opposite the grooves in the sleeve and of less width, the grooves in the sleeve having lateral locking recesses, and molten metal within the grooves in the sleeve and rings for permanently and rotatably uniting the ends of the shafts within the sleeve.

3. A differential shaft coupling comprising a sleeve having dovetail grooves in its inner periphery and lateral locking recesses communicating with the grooves, shafts extending into the sleeve from opposite ends and having grooves opposite the grooves in the sleeve, and molten metal within the grooves in the sleeve and rings for permanently and rotatably uniting the ends of the shafts within the sleeve.

4. A differential shaft coupling comprising a sleeve having dovetail grooves in its inner periphery and lateral locking recesses communicating with the grooves, shafts extending into the sleeve from opposite ends and having grooves the walls of which diverge outwardly and of a width less than that of grooves in the sleeve and molten metal within the grooves in the sleeve and rings for permanently and rotatably uniting the ends of the shafts within the sleeve.

5. A differential shaft coupling, comprising a sleeve having dovetail grooves in its inner periphery and lateral locking recesses communicating with the grooves and dovetailed longitudinally and transverse the sleeve, shafts extending into the ends of the sleeve from opposite ends and having grooves the walls of which diverge outwardly and of a width less than that of the grooves in the sleeve and molten metal within the grooves in the sleeve forming rings for permanently and rotatably uniting the ends of the shafts within the sleeve.

In testimony whereof I hereunto affix my signature in the presence of two witnesses.

WILLIAM CLIFFORD.

Witnesses:
S. GEO. STEVENS,
W. H. DENHAM.

---

Copies of this patent may be obtained for five cents each, by addressing the "Commissioner of Patents, Washington, D. C."